US008982120B1

(12) United States Patent
Kontkanen et al.

(10) Patent No.: US 8,982,120 B1
(45) Date of Patent: Mar. 17, 2015

(54) BLURRING WHILE LOADING MAP DATA

(71) Applicant: Google Inc., Mountain View, CA (US)

(72) Inventors: Janne Matias Kontkanen, San Francisco, CA (US); Evan Hardesty Parker, Los Altos, CA (US); Jonah Jones, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/132,680

(22) Filed: Dec. 18, 2013

(51) Int. Cl.
*G06T 17/00* (2006.01)
*G06T 17/20* (2006.01)
*G06T 19/20* (2011.01)

(52) U.S. Cl.
CPC ..................................... *G06T 19/20* (2013.01)
USPC ........... 345/420; 345/419; 345/582; 345/586; 345/587

(58) Field of Classification Search
CPC ....... G06T 5/20; G06T 11/001; G06T 15/503; G06F 2203/013; G06F 3/016; G06F 3/0346
USPC ......... 345/419, 420, 582, 552, 586, 587, 426, 345/428, 619
See application file for complete search history.

(56) References Cited

U.S. PATENT DOCUMENTS

| | | | | |
|---|---|---|---|---|
| 6,173,372 | B1 * | 1/2001 | Rhoades | 711/147 |
| 6,393,145 | B2 * | 5/2002 | Betrisey et al. | 382/162 |
| 6,469,700 | B1 * | 10/2002 | Munshi et al. | 345/419 |
| 7,091,983 | B1 * | 8/2006 | Donovan | 345/582 |
| 7,817,823 | B1 * | 10/2010 | O'Donnell | 382/103 |
| 8,035,641 | B1 * | 10/2011 | O'Donnell | 345/420 |
| 2006/0181534 | A1 * | 8/2006 | Meinds et al. | 345/473 |
| 2007/0120858 | A1 * | 5/2007 | Meinds | 345/473 |
| 2011/0169822 | A1 * | 7/2011 | Gardella et al. | 345/419 |

FOREIGN PATENT DOCUMENTS

EP 2327055 B1 8/2012

OTHER PUBLICATIONS

Martinez et al. "Space-optimized texture atlases for 3D scenes with per-polygon textures", IEEE Sep. 2010.*
Tzeng et al. "High-Quality Parallel Depth-of-Field Using Line Samples", published 2012.*
"After Effects Help/3D Channel effects", Adobe, Copyright 2014, <http://help.adobe.com/en_US/aftereffects/cs/using/WS3878526689cb91655866c1103a9d3c597-7bd9a.html#WS3878526689cb91655866c1103a9d3c597-7bd8a >.

(Continued)

*Primary Examiner* — Kimbinh T Nguyen
(74) *Attorney, Agent, or Firm* — Lerner, David, Littenberg, Krumholz & Mentlik, LLP

(57) ABSTRACT

Aspects of the disclosure relate to rendering three-dimensional (3D) models to increase visual palatability. One or more computing devices may render an image of a 3D model. This rendering may actually occur in one or more stages. At an interim stage, the one or more computing devices determine an error value for a rendering of a partially-loaded version of the image. The error value is compared to a threshold. Based on the comparison, the one or more computing device generates an at least partially blurred rendering based at least in part on the rendering of the partially-loaded version of the image. The one or more computing devices provide the at least partially blurred rendering and subsequently provide for display a completely loaded version of the image.

20 Claims, 7 Drawing Sheets

(56) References Cited

OTHER PUBLICATIONS

Christensen, et al., "Ray Differentials and Muliresolution Geometry Caching for Distribution Ray Tracing in Complex Scenes", Eurographics 2003, vol. 22, No. 3, 2003.

Demers, Joe, "Chapter 23. Depth of Field: A Survey of Techniques". CPU Gems, Developer Zone, copyright 2004, <http://http.developer.nvidia.com/GPUGems/gpugems_ch23.html>.

Hammon Jr., Earl, "Chapter 28: Practical Pot-Process Depth of Field", GPU Gems 3, Copyright 2008 NVIDIA Corporation, <http://http.developer.nvidia.com/GPUGems3/gpugems3_ch28.html>.

Jeong, et al., "Real-Time Defocus Rendering With Level of Detail and Sub-Sample Blur", Computer Graphics forum, vol. 32, No. 6, 2013, pp. 126-134.

Kopriva, "Camera Lens Blur effect and camera depth of feild properties in After Effects CS5.5", After Effects New, Information & Workflows from Users & Adobe Ae Team, Apr. 13, 2011.

Patterson, "Easy Depth of Field Effect in Photoshop", Copyright 2014, <http://www.photoshopessentials.com/photo-effects/depth-of-field/>.

Wikipedia, "Circle of confusion", Wikipedia, The Free Encyclopedia, last modified on Nov. 15, 2013, <http://en.wikipedia.org/wiki/Circle_of_confusion>.

* cited by examiner

300

BLURRING WHILE LOADING MAP DATA

BACKGROUND

Various systems allow users to view images of three-dimensional ("3D") models. These 3D models may include representations of various locations and objects at those locations such as buildings, vegetation, bodies of water, etc. In some instances, the 3D models may have therewith associated textures (e.g., a brick texture might be associated with a 3D model of a wall in order to have it rendered to appear like a brick wall). The rendering of the 3D model along with the texture may provide a viewer with an immersive experience as if he or she were viewing the simulated location from a particular viewpoint.

SUMMARY

Aspects of the disclosure provide a computer-implemented method for rendering an image of a three-dimensional model to increase visual palatability. The method includes rendering, by one or more computing devices, the image in a plurality of stages. At an interim stage of the plurality of stages the method also includes determining, by one or more computing devices, an error value for a rendering of a partially-loaded version of the image; comparing, by the one or more computing devices, the error value to a threshold value; generating, by the one or more computing devices, an at least partially blurred rendering of the image based at least in part on the error value and the partially-loaded version of the image; and providing for display, by the one or more computing devices, the at least partially blurred rendering. At a final stage of the plurality of stages, the method also includes providing for display, by the one or more computing devices, a completely loaded version of the image.

In one example, the error value corresponds to a level of detail of the three-dimensional image. In another example, the error value corresponds to a number of texels per pixel in the partially-loaded version of the image. In another example, the error value is determined based on at least a number of texels per pixel, a number of texels per meter, and a number of meters per pixel of the three-dimensional image, where texels represent units of texture to be mapped to pixels of a display. In another example, the error value is determined by using an equation: TexelsPerPixel=TexelsPerMeter/MetersPerPixel, where Texels represent units of texture to be mapped to pixels of a display. In another example, the error value is determined based on a measure of a resolution for a texture at a particular pixel. In another example, generating the at least partially blurred rendering includes modulating a pre-computed Poisson disk distribution inside of a circle. In another example, generating the at least partially blurred rendering is performed by a client computing device of the one or more computing devices, and the client computing device also displays the completely loaded version of the image.

Another aspect of the disclosure provides a system for rendering an image of a three-dimensional model to increase visual palatability. The system includes one or more computing devices. The one or more computing devices are configured to render the image in a plurality of stages. At an interim stage of the plurality of stages, the one or more computing devices are also configured to: determine an error value for a rendering of a partially-loaded version of the image; compare the error value to a threshold value; generate an at least partially blurred rendering of the image based at least in part on the error value and the partially-loaded version of the image; and provide for display the at least partially blurred rendering. At a final stage of the plurality of stages, the one or more computing devices are also configured to provide for display a completely loaded version of the image.

In one example, the error value corresponds to a level of detail of the three-dimensional image. In another example, the error value corresponds to a number of texels per pixel in the partially-loaded version of the image. In another example, the one or more computing devices are also configured to determine the error value based on at least a number of texels per pixel, a number of texels per meter, and a number of meters per pixel of the three-dimensional image, where texels represent units of texture to be mapped to pixels of a display. In another example, the one or more computing devices are also configured to determine the error value by using an equation: TexelsPerPixel=TexelsPerMeter/MetersPerPixel, where Texels represent units of texture to be mapped to pixels of a display. In another example, the one or more computing devices are also configured to determine the error value based on a measure of a resolution for a texture at a particular pixel. In another example, the one or more computing devices are also configured to generate the at least partially blurred rendering by modulating a pre-computed Poisson disk distribution inside of a circle. In another example, the one or more computing devices includes a client computing device that generates the at least partially blurred rendering, and the client device is also configured to display the completely loaded version of the image.

A further aspect of the disclosure provides a non-transitory, tangible computer-readable medium on which instructions are stored. The instructions, when executed by a processor, cause the processor to perform a method for rendering an image of a three-dimensional model to increase visual palatability. The method includes rendering the image in a plurality of stages. At an interim stage of the plurality of stages, the method includes: determining an error value for a rendering of a partially-loaded version of the image; comparing the error value to a threshold value; generating an at least partially blurred rendering of the image based at least in part on the error value and the partially-loaded version of the image; and providing for display the at least partially blurred rendering. At a final stage of the plurality of stages, the method also includes, providing for display a completely loaded version of the image.

In one example, the method also includes determining the error further based on at least a number of texels per pixel, a number of texels per meter, and a number of meters per pixel of the three-dimensional image, where texels represent units of texture to be mapped to pixels of a display. In another example, the method also includes determining the error value based on at least a number of texels per pixel, a number of texels per meter, and a number of meters per pixel of the three-dimensional image, where texels represent units of texture to be mapped to pixels of a display. In another example, the method also includes determining the error value using an equation: TexelsPerPixel=TexelsPerMeter/MetersPerPixel, where Texels represent units of texture to be mapped to pixels of a display.

DETAILED DESCRIPTION

Overview

Figure 1:
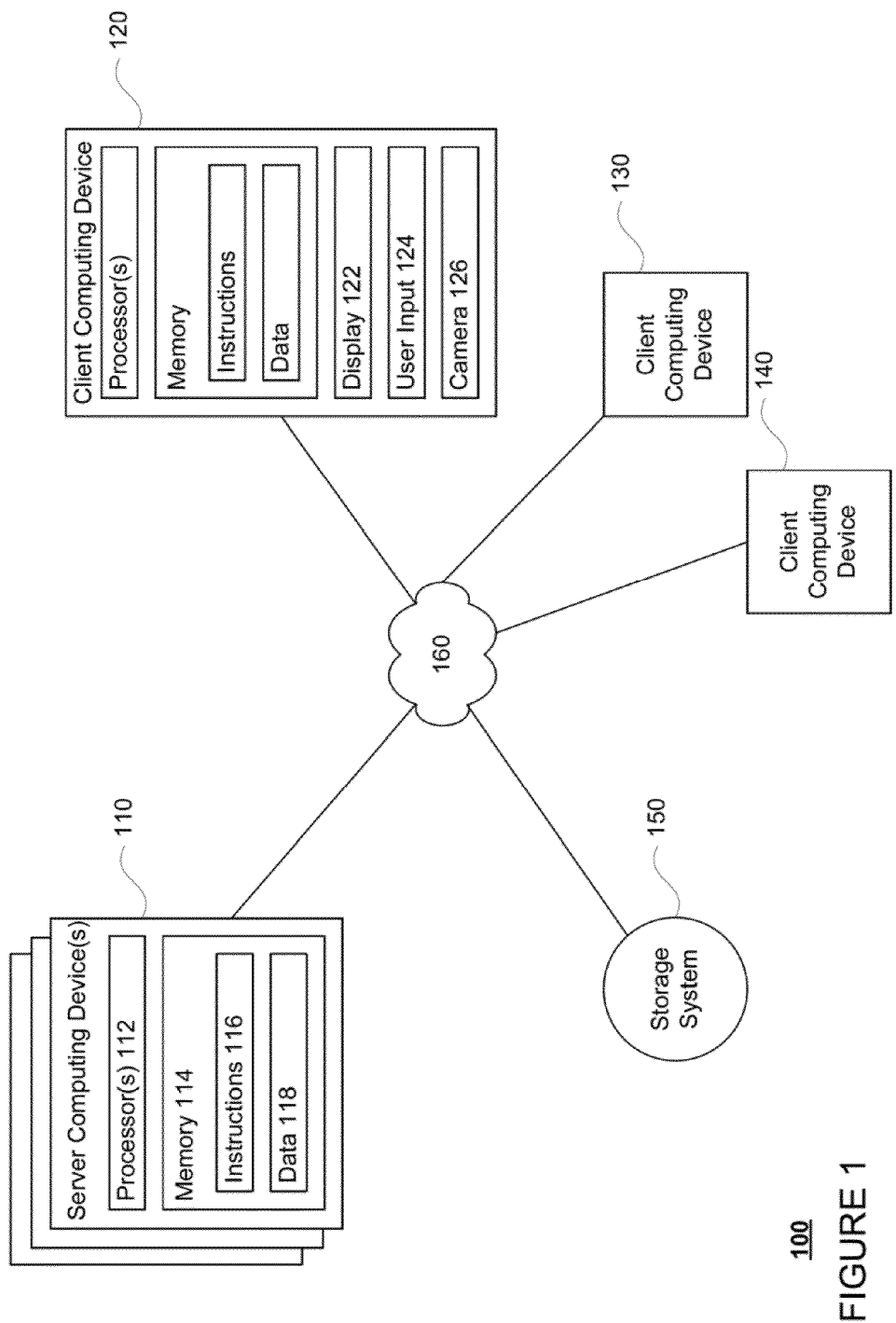
FIG. 1 is a functional diagram of an example system in accordance with aspects of the disclosure.

The technology relates generally to altering the presentation of an image while that image is being rendered on a display. For example, a user may want to view an image such as a 3D model of a location on a display of the user's client computing device. The 3D model may be composed of 3D geometry data (for example, defining the edges of buildings or other objects) as well as texture data (for example, corresponding to the areas within the edges of the various objects).

Because of the amount of detail required for rendering these 3D images, there may be a noticeable loading time when such a 3D image is rendered using conventional computing devices. During this loading time, the 3D image may be rendered in two or more stages, with the interim stages having less than all of the details of the fully rendered version of the 3D image. Typically, coarser (lower-resolution) models containing lower resolution geometry and textures are rendered first. Lower resolution geometry refers to geometry that may be built from fewer polygons and vertices. These different resolutions of geometry and texture data, of 3D models are often called levels of detail (LODs). LODS may be used to render features with less fidelity when they are farther away. This progressive loading can also be used to load 3D models over a potentially slow network.

During this loading, coarse resolution geometry may be displayed with lower resolution textures. Textures can be filtered during rendering in such a way that they appear blurry instead of pixelated in order to make the image more pleasing to the user. However, the geometry often consists of polygons, and coarse resolution means that fewer bigger polygons are used instead of a larger number of smaller ones. In many cases, the edges of these polygons can appear unnaturally sharp. The contrast of the hard geometry with the blurry partially-rendered textures can be unappealing to a user. As an example, the partially rendered image may appear unnatural, which can be less than ideal when the fully rendered 3D image attempts to provide as much realism as possible. Because of this, the sharp geometry of a partially rendered image may be purposely blurred to give the user the impression that the entire image is being loaded gradually.

For instance, the blurring may occur in two rendering passes. In a first pass, an image may be partially rendered. During this first rendering pass, a level of detail or other error value may be determined and stored in a buffer. The stored error value may then be used to determine whether to blur a partially rendered image and also how to blur that partially rendered image. As an example, the error value may be determined from a circle of confusion for the textures at each pixel. The "circle of confusion" may refer to the size of the neighborhood that is averaged at each pixel to produce the blur.

The circle of confusion may be determined at each pixel by using an error value corresponding to any available measure of error as the image progressively loads. For instance, the error can be determined by using the location of a viewer of the image and the inherent error in the different levels of detail of the 3D geometry and texture data. In one example, the circle of confusion, or the diameter of the circle of confusion, may be determined based on the accuracy of the rendered textures on a display of the client computing device. The 3D model may be subdivided into a grid corresponding to different areas within the model. In order to render the image, the cells of the grid may include 3D model data at the same or different resolutions. As an example, cells appearing closer to the user may include data having greater resolution than cells that would appear farther away. Each cell is then mapped to the pixels of the display of the client computing device. The mapped cells may then be rendered on a display in stages. One stage may include a partially rendered image and another stage may include the final image. As noted above, before the partially rendered image is displayed, the circle of confusion may be determined for each pixel. The larger this value, the higher accuracy a texture may have.

The determined circle of confusion for each pixel may be used to implement the blur. The blur may be applied by sampling within the circle of confusion for that pixel. If only a small number of samples are taken, the blurred image may have the look of frosted glass. The blurred partially rendered image may then be displayed on the display of the computing device before the final image is displayed.

In some aspects, the blurring may be implemented by using a disk pattern to sample within the circle of confusion of a particular pixel. In one example, a Poisson disk distribution may be used. Generating a Poisson disk sampling pattern may be computationally intensive, so in some applications, a precomputed sampling pattern may be determined and reused for all of the pixels. To account for the different diameters of the circle of confusion at each pixel, the pattern can be modulated by the diameter of the circle of confusion for that pixel. Also, to reduce the correlation of the sampling pattern at neighboring pixels, a random rotation to the pattern can be applied at each pixel. By doing so, the blurring will be more random, such that the user may not be aware of the blurring or able to determine that the blurring is being done is any type of pattern. This technique also does not require that the client computing device add or remove detail or data of the 3D model from the image.

Example Systems

Figure 2:
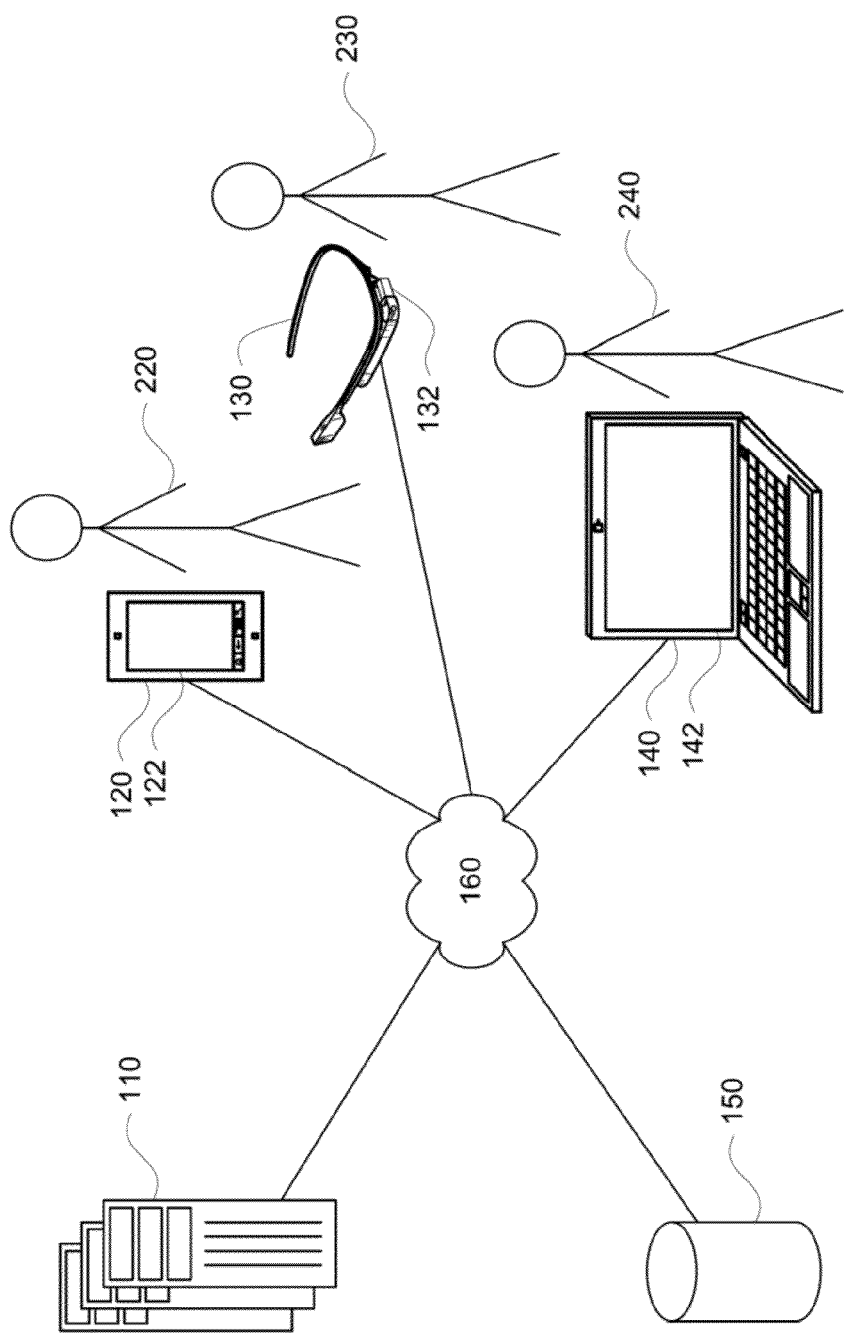
FIG. 2 is a pictorial diagram of the example system of FIG. 1.

FIGS. 1 and 2 depict an example system 100 in which the features described above may be implemented. This example should not be considered as limiting the scope of the disclosure or usefulness of the features described herein. In this example, system 100 includes computing devices 110, 120, 130, and 140 as well as storage system 150. Computing device 110 contains one or more processors 112, memory 114 and other components typically present in general purpose computing devices. Memory 114 of computing device 110 store information accessible by processor 112, including instructions 116 that can be executed by the processor 112.

Memory also includes data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, each processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160.

The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), non-transitory memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 is configured to store image information. As noted above, this image information may include 3D models as discussed above. The 3D models may be stored as texture data along with the 3D geometry data. The 3D geometry data may include a plurality of polygons defining the outlines of various objects, while the texture data may include the texture or imagery data within those polygons. The 3D geometry information may also include location information location coordinates such as latitude, longitude, altitude, etc. for the geometry. As an example, a 3D model may be stored as a triangular mesh with various textures corresponding to each triangle of the mesh.

The image information may also include 3D geometry data and texture data for rendering the same 3D model or the same location at different resolutions. The resolution of the 3D geometry and texture data may be considered an "inherent" error. In some aspects, a single rendered image may include 3D geometry data and texture data at different resolutions according to camera parameters. These camera parameters may include the zoom, aperture size, etc. of an imaginary camera having a lens located at a viewpoint of the user.

As an example, before an image is rendered, the 3D geometry data and texture data may be selected based on where the corresponding objects would appear relative to the view. Objects closer to the viewer may be rendered in more detail, while objects farther from the view may be rendered in less detail.

As with memory 114, storage system 150 can be of any type of non-transitory storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

A user may request to view an image of a 3D model on his or her client computing device. If the user would like to view a 3D model of a particular location, the request may include information that can be used to identify a relevant portion of a 3D model, such as an address, location coordinates, landmark or business name, an image of a location, or any other such information.

As an example, client computing device 120 may send a request to one or more of server computing devices 110 for an image of a particular location. One or more of server computing devices 110 may respond by retrieving relevant image information, including 3D geometry and texture data, from storage system 150 and sending it to the client computing device 120. Alternatively, client computing device 120 may retrieve the image information from local storage. Moreover the pixel mapping, sampling, and blurring aspects described below may be performed all or in part by a client computing device and/or more of server computing devices.

As noted above, this image information may include 3D geometry and texture data for rendering different parts of an image at different resolutions. The image information may be mapped to the pixels of the display of client computing device and used to render the image of the 3D model.

As discussed above, the image may be rendered in stages. At least one of the stages may include a partially rendered image occurring after a first or primary rendering pass. Another stage may include the final image. Other intermediate stages may also be used to render an image of a 3D model. Because the 3D geometry data is typically rendered in the first or primary rendering pass, the partially rendered image in an initial stage may include sharp geometry filled with blurry textures corresponding to the areas within the geometry when the partially rendered image is displayed. As discussed above, this may appear strange or be displeasing to a user. Again, some of the intermediate stages may also suffer from a similar problem.

Figure 3:
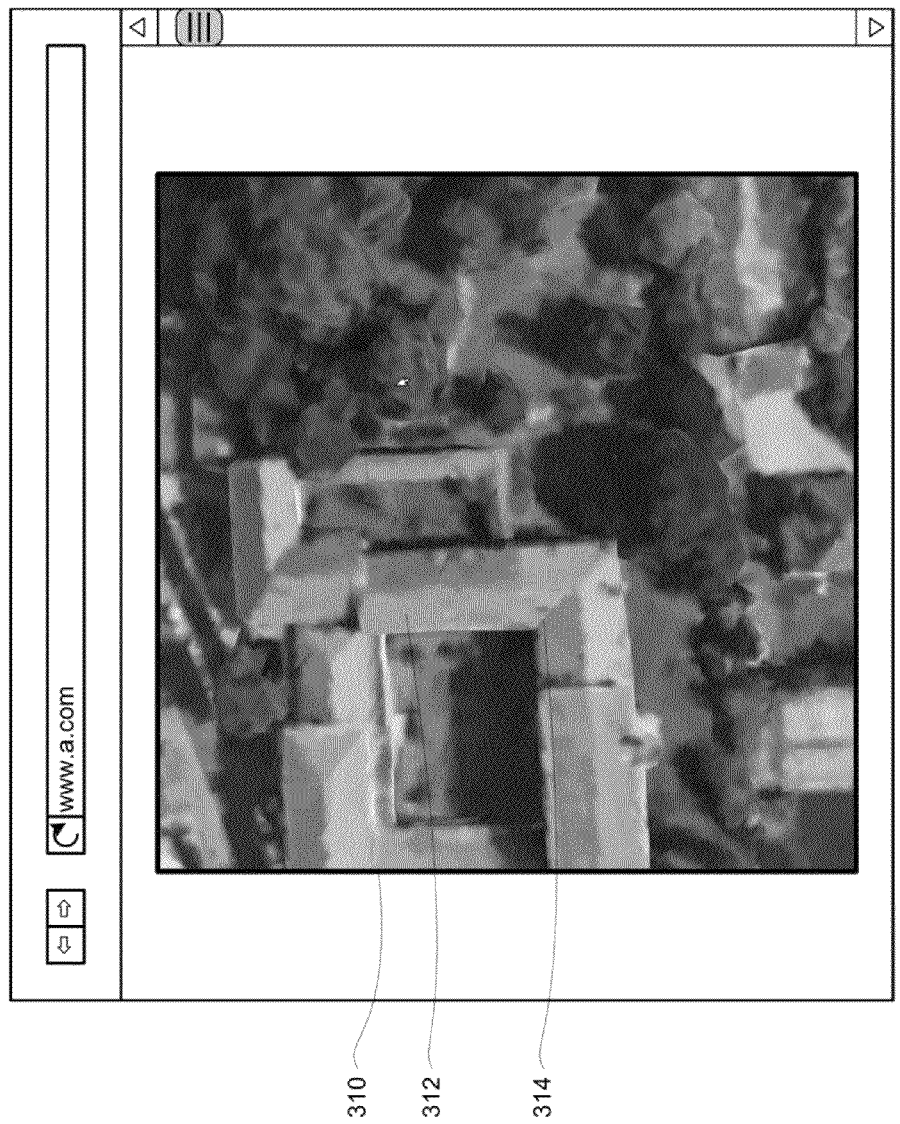
FIG. 3 is an example screen shot in accordance with aspects of the disclosure.

FIG. 3 is an example screen shot 300 of a partially rendered image 310. In this example, the contrast between the blurry textures of a roof 312 and the sharp edges of the 3D geometry 314 of that roof can be seen. These blurry textures may eventually become less blurry in later stages of the rendering and also when the final image is completely loaded.

Before the partially rendered image is displayed, one or more error values may be determined. These error values may be determined for each pixel from the partially rendered image. For instance, the error values can be determined by using the location of a viewer of the 3D image, the inherent error or resolution of the 3D geometry data and texture data, and any available measure of error as the image progressively loads such as the resolution of the partially loaded image.

As an example, the error values may correspond to the circle of confusion for each pixel. The circle of confusion for each pixel may be determined by the equation: C=TexelsPerPixel=TexelsPerMeter/MetersPerPixel. The value C corresponds to a diameter of a circle of confusion. Texels represent units of texture to be mapped to the pixels of the display. Thus, TexelsPerMeter is a measure of the accuracy or resolution for each texture as the image is being rendered. This value may also provide an estimate of how well represented a texture is in a displayed image. The larger this value, the higher accuracy or resolution a texture may have. While TexelsPerMeter refers to the resolution of a texture, the accuracy of the geometry data may also be proportional to this value. Thus, TexelsPerMeter may also indicate the accuracy or resolution of the geometry data.

MetersPerPixel measures how many meters a single pixel covers on a specific distance. This can be estimated from the parameters associated with the 3D model, including geographic location and/or camera parameters such as location coordinates, zoom, aperture size, etc. In this scenario, when TexelPerPixel is equal to 1, this may represents an ideal accuracy where the resolution or level of detail is just right for the image. For example, having more texels or individual textures would not bring new detail to the image because a single pixel could can only display a single texture.

The circle of confusion data for each pixel may be output to a frame buffer channel during a rendering pass. For example, an alpha channel frame buffer of an application programming interface (API) rendering program may be used. Thus, this technique may especially useful in systems which do not utilize the alpha channel frame buffer when rendering a 3D image. If the alpha channel frame buffer is not available or is used for some other purpose by the computing device, a frame buffer or storage can be used to store the circle of confusion data. If an API of the computing device supports writing into multiple render targets at the same time, the circle of confusion can still be written in the same rendering pass as the R,G,B channels, otherwise a separate render pass might be needed to write out the circle of confusion data.

The circle of confusion data may be used to blur the 3D geometry of the partially rendered image. The diameter of the circle of confusion may be specified in pixels, such as 1 pixel or more. If the diameter of the circle of confusion is less than 1 pixel, the circle of confusion would not each any neighboring pixels, and thus, the result would appear sharp as there is no real blurring. In this regard, if the diameter of the circle of confusion is less than a threshold, such as 1 pixel width, there may be no further blurring of the partially rendered image or rather, no blurring of the geometry of the partially rendered image. This may prevent the blurring of more than a pixel width if MetersPerPixel is equal to one.

The determined circle of confusion may be used as the diameter of a blur kernel in pixels in order to evaluate the blur for each pixel. A blur kernel is a function that is used to perform the blurring and may define the weights associated with each evaluated pixel. These weights may have positive values close to a pixel being evaluated and goes to zero away from that pixel. As an example of such a function, for each particular pixel, a new pixel value may be determined by averaging all of the neighboring pixels within the determined diameter of the circle of confusion for that particular pixel. Thus, the blur kernel may be any function that is zero if the distance to the evaluated pixel is larger than a predefined radius, here half of the diameter of the circle of confusion for that evaluated pixel, and otherwise has a constant value.

Figure 4:
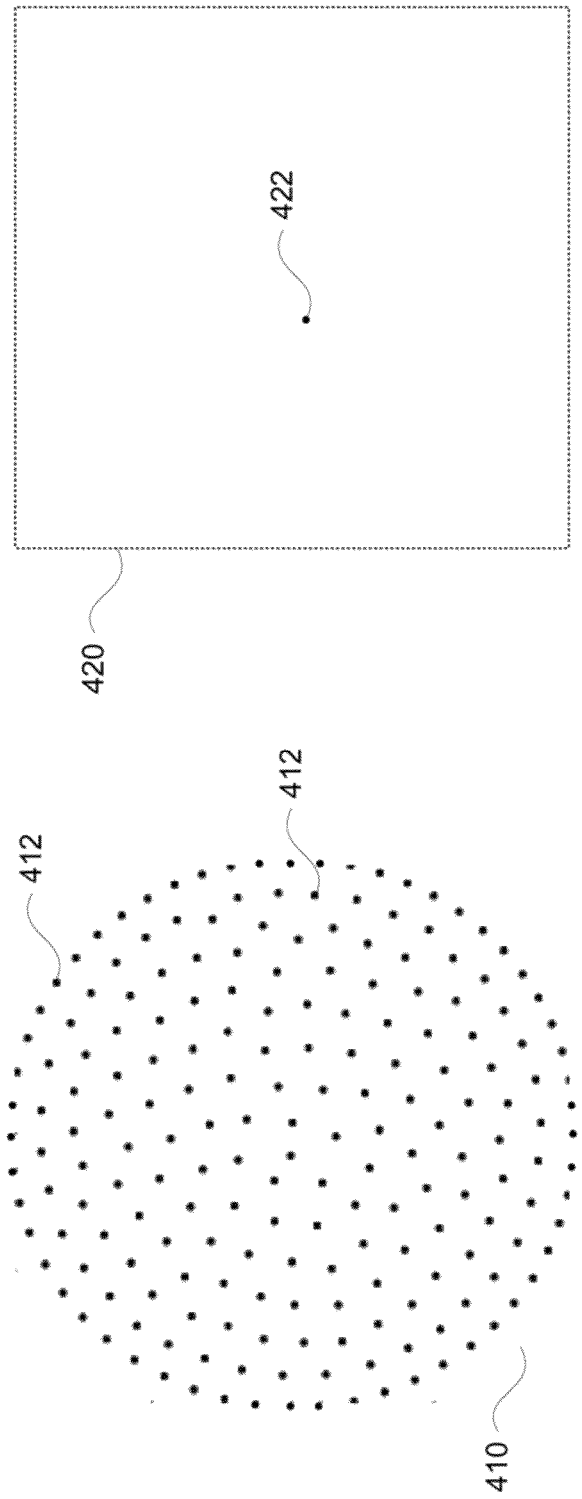
FIGS. 4A and 4B are example sampling schemes in accordance with aspects of the disclosure.

In some aspects, the blurring may be implemented by using a disk pattern to sample within the circle of confusion of a particular pixel. In one example, a Poisson disk distribution may be used. This distribution may be pre-computed and used to sample the blur for all of the pixels. FIG. 4A is an example of a sampling scheme using a pre-computing Poisson disk 410 including a plurality of sampling points 412.

The greater the number of samples taken, the greater the amount of processing resources will be required to compute them. Thus, a small number of samples, such as 1, 5 or 29, as opposed to 50 or more, may be used. As an example, with only one sample, a random point may be sampled within a box having a width that is similar or equal to the diameter of the circle of confusion. FIG. 4B is an example of a sampling scheme including a single sampling point 422 within a box having a width roughly equal to a diameter of a circle of confusion.

Also, to reduce the correlation of the sampling pattern at neighboring pixels, a random rotation to the pattern can be applied at each pixel. As an example, to account for the different diameters of the circle of confusion at each pixel, the pattern can be modulated by the diameter of the circle of confusion for that pixel. For instance, the radius of a pre-computed Poisson disk distribution inside of a circle, such as that shown in FIG. 4A, may be modulated using the determined diameter of the circle of confusion for the evaluated pixel in order to create a rotating disc pattern. As an example, the original distribution of samples may lie within a disk having a radius of 1 and center (0,0). To change the radius, the coordinates around the disc can be multiplied by C/2 or the radius of the determined circle of confusion for the pixel being evaluated.

The random rotations may randomize the blurring pattern in every pixel such that the pattern is somewhat uncorrelated between neighboring pixels. Because the blurring will appear to be random, the user may not be aware of the blurring or able to determine that the blurring is being done is any type of pattern. If only a small number of samples are taken, such as 1, 5, or 29, as opposed to 50 or more, the final blurred image may have the look of frosted glass. Alternatively, blurring with correlated samples may appear strange to the user. This technique also does not require that the client computing device add or remove detail from the 3D image.

Figure 5:
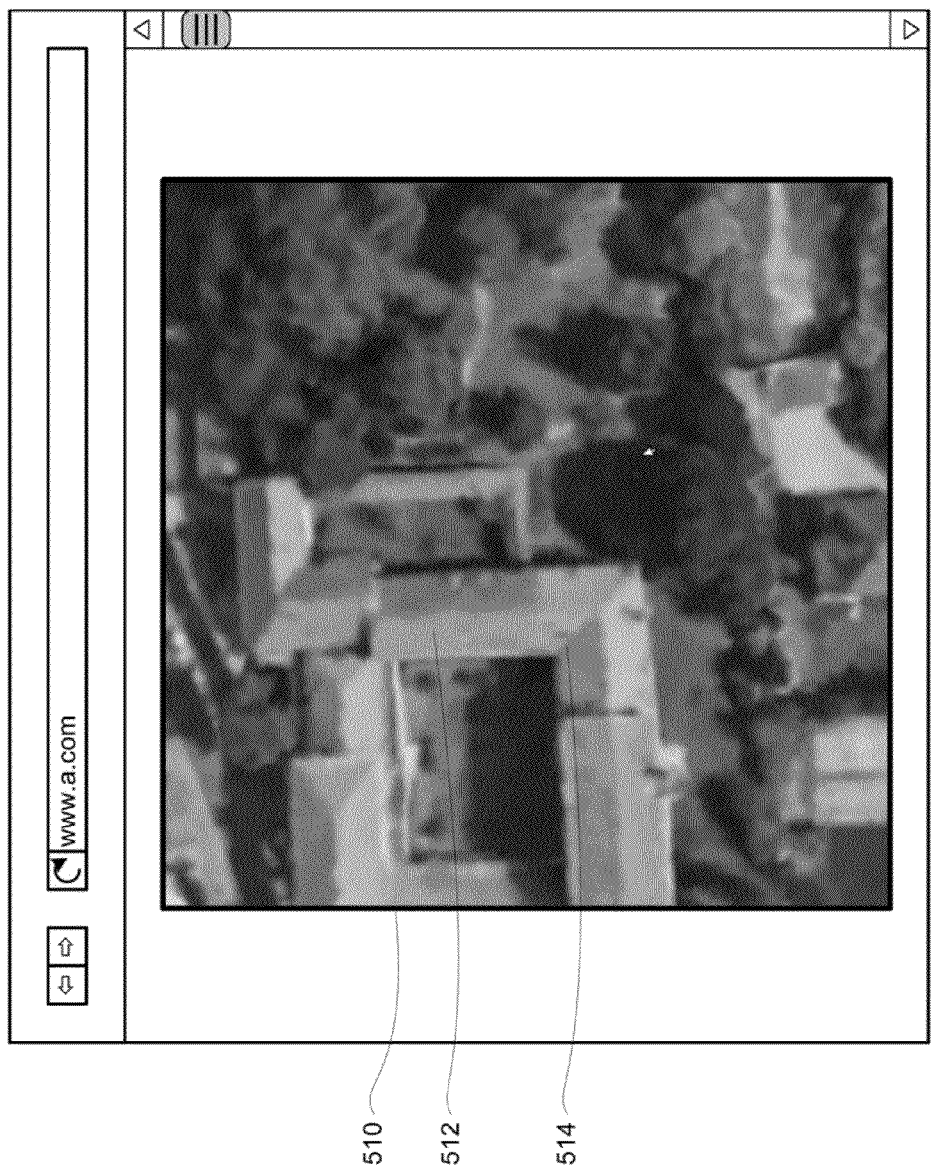
FIG. 5 is another example screen shot in accordance with aspects of the disclosure.
Figure 6:
FIG. 6 is example images in accordance with aspects of the disclosure.

FIG. 5 is an example screen shot 500 including a partially rendered image 510 corresponding to image 310 with blurred 3D geometry. In this example, there is less of a contrast between the textures of 512 of a roof and the edges of the 3D geometry 514 of that roof. FIG. 6 provides a side by side comparison of images 310 and 510 to further demonstrate the effect of the blurring on a partially rendered image. The blurred image 510 appears softer and more realistic, thereby increasing the visual palatability of the non-blurred image 310.

The blurred partially rendered image may then be displayed on the display of the client device. In subsequent intermediate rendering passes, other partially rendered images may also be displayed. These subsequent rendering passes may also be sampled and blurred using the aspects described herein. However, given the processing power required, the burring may only be needed for an initial rendering pass. Once the final image is displayed, there may no longer be a sharp contrast between the 3D geometry and textures of the images, and thus the blur may no longer be necessary.

Figure 7:
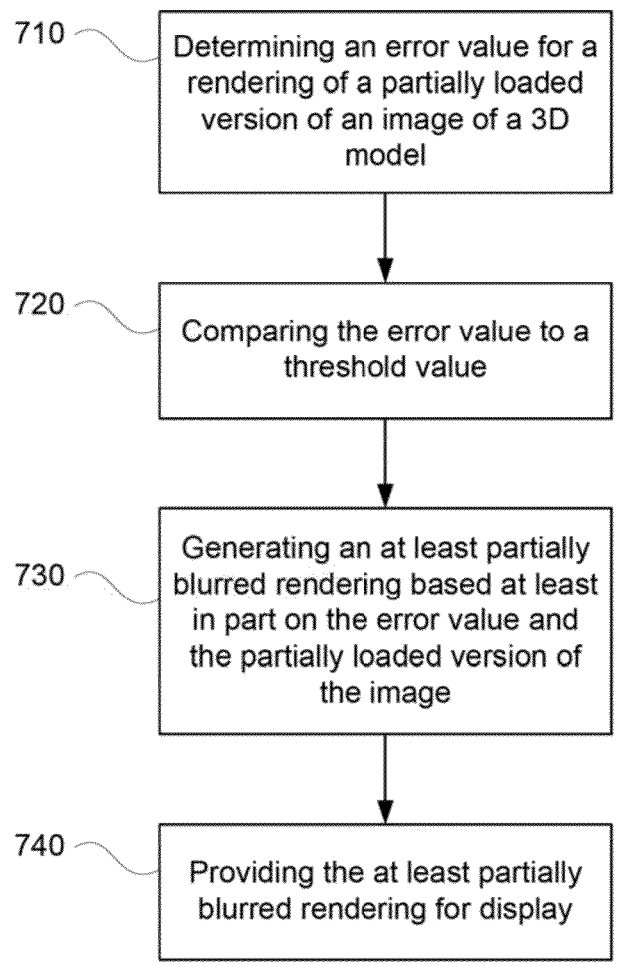
FIG. 7 is a flow diagram in accordance with aspects of the disclosure.

Flow diagram 700 of FIG. 7 is an example of steps that may be performed by one or more computing devices, such as server computing devices 110 and/or client computing devices 120, 130, and 140, in accordance with aspects of the technology described herein. In this example, an image of a three-dimensional model is rendered in a plurality of stages. At an interim stage, an error value for a rendering of a partially-loaded version of the image is determined as shown in block 710. The error value is compared to a threshold value at block 720. An at least partially blurred rendering is generated based at least in part on the error value and the partially-loaded version of the image. The at least partially blurred rendering is provided for display at block 730. At a final stage of the plurality of stages a completely loaded version of the image is provided for display.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method for rendering an image of a three-dimensional model to increase visual palatability, the method comprising:
   rendering, by one or more computing devices, the image in a plurality of stages;
   at a first stage of the plurality of stages:
      determining, by one or more computing devices, an error value corresponding to a circle of confusion of a first pixel of a first version of the image corresponding to a partially-loaded version of the image;
      determining, by the one or more computing devices, whether the error value is greater than a threshold value;
      when the error value is greater than the threshold value, generating, by the one or more computing devices, an at least partially blurred rendering of the image by blurring the first version of the image without removing detail of the image in order to reduce contrast between geometry data and texture data of the first version of the image; and
      providing for display, by the one or more computing devices, the at least partially blurred rendering of the image;
   at a second stage of the plurality of stages:
      determining, by the one or more computing devices, a second error value corresponding to a circle of confusion value for a second pixel of a rendering of a second version of the image;
      determining, by the one or more computing devices, whether the second error value is greater than the threshold value; and
      when the second error value is less than the threshold value, providing for display, by the one or more computing devices, the second version of the image without blurring the second version of the image in order to reduce contrast between geometry data and texture data of the second version of the image.

2. The method of claim 1, wherein the error value further corresponds to a level of detail of the three-dimensional image.

3. The method of claim 1, wherein the error value further corresponds to a number of texels per pixel in the partially loaded version of the image.

4. The method of claim 1, wherein the error value is determined based on at least a number of texels per pixel, a number of texels per meter, and a number of meters per pixel of the three-dimensional image, where texels represent units of texture to be mapped to pixels of a display.

5. The method of claim 1, wherein the error value is determined by using an equation: TexelsPerPixel=TexelsPerMeter/MetersPerPixel, where Texels represent units of texture to be mapped to pixels of a display.

6. The method of claim 1, wherein the error value is determined based on a measure of a resolution for a texture at the first pixel.

7. The method of claim 1, wherein generating the at least partially blurred rendering includes modulating a pre computed Poisson disk distribution inside of the circle of confusion.

8. The method of claim 1, wherein the second version of the image is a fully-loaded version of the image such that the partially-loaded version of the image includes less texture detail than the fully-loaded version of the image.

9. The method of claim 1, further comprising:
displaying, by a client computing device of the one or more computing devices, the at least partially blurred rendering of the image provided for display on a display of the client computing device; and
subsequent to displaying the at least partially blurred rendering of the image provided for display, displaying, by the client computing device, the second version of the image provided for display on the display.

10. The method of claim 9, wherein the at least partially blurred rendering of the image provided for display and the second version of the image provided for display are displayed such that the image appears to be displayed in progressive stages on the display.

11. A system for rendering an image of a three dimensional model to increase visual palatability, the system comprising—one or more computing devices configured to:
loading the image in a plurality of stages;
determine error values for a version of the image as the image is being loaded in the plurality of stages;
when one of the error values is greater than a threshold value:
generate an at least partially blurred rendering of a partially-loaded version of the image without removing detail of the image, and
provide for display the at least partially blurred rendering; and
subsequent to providing for display the at least partially blurred rendering and when another of the error values is greater than the threshold value, provide for display a completely loaded version of the image.

12. The system of claim 11, wherein the error values corresponds to a level of detail of the three-dimensional image.

13. The system of claim 12, wherein the error values corresponds to a number of texels per pixel in the partially loaded version of the image.

14. The system of claim 12, wherein the one or more computing devices are further configured to determine the error values based on at least a number of texels per pixel, a number of texels per meter, and a number of meters per pixel of the three-dimensional image, where texels represent units of texture to be mapped to pixels of a display.

15. The system of claim 12, wherein the one or more computing devices are further configured to determine the error values by using an equation: TexelsPerPixel=TexelsPerMeter/MetersPerPixel, where Texels represent units of texture to be mapped to pixels of a display.

16. The system of claim 12, wherein the one or more computing devices are further configured to determine the error values based on a measure of a resolution for a texture at a particular pixel.

17. The system of claim 12, wherein the one or more computing devices are further configured to generate the at least partially blurred rendering by modulating a pre-computed Poisson disk distribution inside of a circle.

18. A non-transitory, tangible computer-readable medium on which instructions are stored, the instructions, when executed by a processor, cause the processor to perform a method for rendering an image of a three-dimensional model to increase visual palatability, the method comprising:
rendering the image in a plurality of rendering passes;
in a first rendering pass of the plurality of rendering passes:
determining an error value for a rendering of a partially-loaded version of the image for the first rendering pass;
comparing the error value to a threshold value;
when the error value is greater than the threshold value, generating an at least partially blurred rendering of the image based at least in part on the error value and the partially-loaded version of the image without removing detail of the image;
providing for display the at least partially blurred rendering; and
in a second rendering pass of the plurality of rendering passes:
determining a second error value for a rendering a second version of the image corresponding to the second rendering pass;
when the second error value is less than the threshold value, providing for display the second version of the image as a completely loaded version of the image.

19. The medium of claim 18, wherein the method further includes determining the error value further based on at least a number of texels per pixel, a number of texels per meter, and a number of meters per pixel of the three-dimensional image, where texels represent units of texture to be mapped to pixels of a display.

20. The medium of claim 18, wherein the method further includes determining the error value using an equation: TexelsPerPixel=TexelsPerMeter/MetersPerPixel, where Texels represent units of texture to be mapped to pixels of a display.

* * * * *